United States Patent [19]

Spijker

[11] Patent Number: 4,780,302

[45] Date of Patent: Oct. 25, 1988

[54] PROCESS FOR THE PREPARATION OF ALKALI METAL FLUOTITANATES

[75] Inventor: Ruud Spijker, Heemskerk, Netherlands

[73] Assignee: Stamicarbon B.V., Geleen, Netherlands

[21] Appl. No.: 878,593

[22] Filed: Jun. 26, 1986

[30] Foreign Application Priority Data

Jul. 13, 1985 [NL] Netherlands ............ 8502020

[51] Int. Cl.⁴ .............. C01D 3/02; C01G 23/02
[52] U.S. Cl. .................. 423/464; 423/72; 423/82
[58] Field of Search ......... 423/72, 82, 84, 85, 423/464, DIG. 9, DIG. 15, 658.5, 472, 489; 75/1 T; 159/DIG. 21

[56] References Cited

U.S. PATENT DOCUMENTS

| | | | |
|---|---|---|---|
| 3,956,147 | 5/1976 | Becker et al. | 423/490 |
| 4,359,449 | 11/1982 | Hard et al. | 423/84 |
| 4,497,779 | 2/1985 | Kramer et al. | 423/465 |

FOREIGN PATENT DOCUMENTS

| | | | |
|---|---|---|---|
| 517634 | 10/1955 | Canada | 423/82 |
| 543049 | 7/1957 | Canada | 423/464 |
| 720655 | 12/1954 | United Kingdom | 75/1 T |

OTHER PUBLICATIONS

Hackh's Chemical Dictionary, 4th ed., Grant, ed. McGraw-Hill Book Co., 1969, pp. 66, 275, 332.
Chemical Engineers' Handbook, 5th ed., Perry & Chilton, eds., McGraw-Hill Book Co., 1973, pp. 8–12, 21–30.

*Primary Examiner*—John Doll
*Assistant Examiner*—Jeffrey E. Russel
*Attorney, Agent, or Firm*—Cushman, Darby & Cushman

[57] ABSTRACT

Process for the preparation of alkali metal fluotitanates by fluorination of a titanium ore, reaction with an alkali metal compound, precipitation and separation of the formed alkali metal fluotitanates, wherein the titanium ore is mixed with a hydrofluosilicate solution, the resulting suspension is evaporated at a temperature of 90°–110° C., the residue is subsequently taken up in water or in a mineral acid and the residue solution is neutralized with an alkali metal compound.

9 Claims, No Drawings

PROCESS FOR THE PREPARATION OF ALKALI METAL FLUOTITANATES

The invention relates to a process for the preparation of alkali metal fluotitanates by fluorination of a titanium ore and reaction with an alkali metal compound, precipitation and separation of the alkali metal fluotitanates formed.

Such a process is known from U.S. Pat. No. 4,390,365. In this known process fluorination of titanium ore is effected by contacting the titanium ore with sodium fluosilicate at a temperature of 600°-1000° C.

A drawback of said process is that very high temperatures are required for fluorination, which of course entails a very high energy consumption. In addition, the high temperatures necessitate use of advanced equipment for which highly corrosion resistant materials are to be applied.

The object of the invention is to provide a process for the preparation of alkali metal fluotitanates in which the digestion of the titanium ore is effected at lower temperatures, as a result of which the above-mentioned drawbacks are not or hardly encountered.

According to the invention this is achieved in that the titanium ore is mixed with a fluosilicic acid ($H_2SiF_6$) solution and the resulting suspension is evaporated at a temperature of 90°-110° C., the residue is subsequently taken up in water or in a mineral acid and the residue solution is neutralized by means of an alkali metal compound.

Suitable alkali metal compounds are an alkali metal carbonate or an alkali metal hydroxide, in the solid state or in solution.

As titanium ore, in principle all ores containing titanium can be used, for instance rutile or ilmenite.

The concentration of the fluosilicic acid solution is not critical. Preferably a 15-36 wt. % fluosilicic acid solution is started from. Such a solution can be obtained by diluting or concentrating industrial fluosilicic acid solutions, which are obtained as byproduct by scrubbing of silicon and fluorine containing off-gases from a phosphate digestion and/or an evaporation section of a wet process phosphoric acid production unit.

The suspension will generally contain 5-20 wt. % titanium, calculated as the amount of titanium dioxide relative to the amount of fluosilicic acid.

In the neutralization of the residue solution such an amount of the alkali metal compound is added as to result in complete precipitation of the alkali metal fluotitanate. This corresponds with a pH value between 3 and 5.

Impurities in the titanium ore that, as such or after forming compounds, are present as insoluble material in the residue solution, can if necessary be separated before neutralization, for instance by filtration or centrifuging.

For process economical and environmental reasons it is important for the gaseous hydrofluoride and silicon tetrafluoride released on digestion of the titanium ore to be kept in the system and to be recycled. It is preferred to do this by absorbing the hydrofluoride and silicon tetrafluoride released in water or in a fluosilicic acid solution using known techniques.

There is advantage in using water as solvent for the residue, as this will result in the lowest impurity content of the final product, while less alkali metal salts need to be drained.

If a titanium ore containing few impurities and admixtures is started from, such as rutile, a potassium compound is preferably applied as alkali metal compound. This has the advantage that, because of its low water solubility, the formed potassium fluotitanate is immediately precipitated, following which it can be separated, for instance by filtering or centrifuging.

If an impure titanium ore is used, there is advantage in applying a sodium compound as alkali metal compound. The sodium fluotitanate, which is fairly soluble, remains dissolved and the precipitated impurities can be separated.

If an ore with a high bivalent iron content is used, for instance ilmenite, the iron in the solution can be oxidized using, for instance, atmospheric oxygen, upon which it is precipitated as ferric hydroxide and can be separated.

The solution containing sodium fluotitanate can subsequently be cooled or evaporated, resulting in precipitation of sodium fluotitanate. However, this precipitate often is highly impure as impurities end up also in the precipitate on cooling or evaporating. Preferably a potassium salt is added to the sodium fluotitanate solution, without forced cooling or evaporation, as a result of which potassium fluotitanate is precipitated, in a purer form.

As is known, alkali metal fluotitanates are eminently suitable as starting material for the preparation of metallic titanium by the molten salt electrolysis method.

The invention will now be elucidated with reference to the following example, without being limited to the embodiment described.

EXAMPLE

In an open 2-litre polytetrafluoroethylene (PTFE) reaction vessel 65 g dried rutile ore is suspended in 1000 g of a 36 wt. % fluosilicic acid solution obtained as byproduct in a phosphoric acid process, use being made of a PTFE blade mixer. While being stirred, the vessel contents were evaporated to dryness in about 6 hours at 90°-110° C. Indications of the end of the evaporation process were the absence of further $SiF_4$ mist formation and the increase in vessel temperature to about 120° C. At the end of fluorination 159 g viscous, turbid liquid remained.

The residue was subsequently taken up in demineralized water until a total weight of 700 g was reached.

Using a tubular centrifuge with PTFE tubes the insoluble material was separated, subsequently washed out with acetone and dried at 45° C.

This resulted in 0.3 g precipitate (=0.5% of feed). The clear filtrate was divided into two portions, A and B, having a weight of 330 and 362 g, respectively.

To amount A, ground and chemically pure $K_2CO_3$ was dosed with proper stirring until a pH of 4 was reached (in total 41.9 g $K_2CO_3$). The resulting flocculent precipitate was separated by means of a Büchner filler and washed out with acetone. After drying at 45° C., 74.1 g dry matter remained. X-ray diffraction analysis proved this to be potassium fluotitanate.

Portion B was treated with a 50% KOH solution until a pH of 3 to 4 was reached. This corresponds with a dose of 37.2 g chemically pure KOH. Again the solid matter was separated, washed and dried at 45° C. The weight of the dry matter was 81.2 g. X-ray diffraction analysis showed this to be potassium fluotitanate.

On the basis of the TiO₂ content an overall efficiency was calculated: 87% for the K₂CO₃ treatment and 94% for the KOH dosing.

What is claimed is:

1. A process for the preparation of alkali metal fluotitanates which consists essentially in mixing a titanium ore with a fluosilicic acid ($H_2SiF_6$) solution, evaporating the resulting suspension at a temperature of from 90° to 110° C., treating the residue with water or an aqueous mineral acid and thereafter neutralizing the residue solution with an alkali metal compound to precipitate, and permit separation of, an alkali metal fluotitanate.

2. Process according to claim 1 wherein said alkali metal compound is an alkali metal carbonate or an alkali metal hydroxide.

3. The process of claim 1 wherein said residue is dissolved in water.

4. The process of claim 1 wherein said fluosilicic acid solution has a concentration of from 15 to 36 wt. %.

5. Process according to claim 1 wherein said suspension contains an amount of titanium ore, calculated as titanium dioxide, relative to the amount of said fluosilicic acid contained in said solution, of from 5 to 20 wt %.

6. The process of claim 1 wherein said residue solution is neutralized to pH value between 3 and 5.

7. The process of claim 1 wherein said residue solution is neutralized with a potassium compound.

8. The process of claim 1 wherein said residue solution is neutralized with a sodium compound to form an initial precipitate, and said initial precipitate is separated prior to precipitation of sodium fluotitantes.

9. Process according to claim 1 wherein said residue solution is neutralized with a sodium compound, the initial precipitate form is separated, and thereafter a potassium salt is added to form the alkali metal fluotitanates.

* * * * *